US009645656B2

(12) United States Patent
Gustafsson

(10) Patent No.: US 9,645,656 B2
(45) Date of Patent: May 9, 2017

(54) METHOD FOR TEXT INPUT, APPARATUS, AND COMPUTER PROGRAM

(75) Inventor: Harald Gustafsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1270 days.

(21) Appl. No.: 13/583,671

(22) PCT Filed: Feb. 28, 2011

(86) PCT No.: PCT/EP2011/052893
§ 371 (c)(1),
(2), (4) Date: Oct. 10, 2012

(87) PCT Pub. No.: WO2011/113683
PCT Pub. Date: Sep. 22, 2011

(65) Prior Publication Data
US 2013/0055158 A1 Feb. 28, 2013

Related U.S. Application Data

(60) Provisional application No. 61/317,870, filed on Mar. 26, 2010.

(30) Foreign Application Priority Data

Mar. 15, 2010 (EP) .................................... 10156555

(51) Int. Cl.
G06F 3/048 (2013.01)
G06F 3/023 (2006.01)

(52) U.S. Cl.
CPC .................. *G06F 3/0237* (2013.01)

(58) Field of Classification Search
CPC ...................................................... G06F 3/048
(Continued)

(56) References Cited

U.S. PATENT DOCUMENTS

2009/0112576 A1* 4/2009 Jackson ................ G06F 17/276
704/9

FOREIGN PATENT DOCUMENTS

EP 2053491 A1 4/2009

* cited by examiner

*Primary Examiner* — Andrea Leggett
(74) *Attorney, Agent, or Firm* — Murphy, Bilak & Homiller, PLLC

(57) ABSTRACT

A method for text input by ambiguous input sequences entered by a user is disclosed. The method comprises a primary process of receiving a user input on an input device having a plurality of selectable input items being associated with characters, an input sequence being generated in dependence of selection of an input item, wherein the generated input sequence corresponds to the sequence of input items that have been selected, and wherein the generated input sequence has a textual interpretation that is a textual interpretation that is ambiguous, and displaying on a display a textual interpretation. The method also comprises a secondary process, initiated upon receiving an input associated with a delete-character command, deleting an interpreted character, and returning to the primary process where interpretations associated with the deleted character for that position of input text are excluded, wherein the primary and secondary processes are performed until a user input associated with a confirm-text command is received. An apparatus comprising an input device having a plurality of selectable input items enabling text input by ambiguous input sequences entered by a user, the apparatus further comprising a processor and a display, wherein the processor is arranged to control the text input processes. A computer program is also disclosed.

19 Claims, 2 Drawing Sheets

METHOD FOR TEXT INPUT, APPARATUS, AND COMPUTER PROGRAM

TECHNICAL FIELD

The present invention generally relates to an approach for text input. In particular, the invention relates to a method for text input by ambiguous input sequences entered by a user, to an apparatus comprising an input device, and to a computer program for implementing such text input.

BACKGROUND

Text input may be slow or cumbersome, especially when considering small apparatuses. Different approaches have been presented for being an aid to the user for making text input. However, either the text input is not easy or fast enough, or the apparatus will be too rigid in its aid to the user since an apparatus never can predict all intentions of a user's text. Thus, there is a need for improving text input.

SUMMARY

An object of the invention is to at least alleviate the above stated problem. The present invention is based on the understanding that user intervention in interpretation candidate can enhance text input.

According to a first aspect, there is provided a method for text input by ambiguous input sequences entered by a user. The method comprises a primary process of receiving a user input on an input device having a plurality of selectable input items being associated with characters, an input sequence being generated in dependence of selection of an input item, wherein the generated input sequence corresponds to the sequence of input items that have been selected, and wherein the generated input sequence has a textual interpretation that is a textual interpretation that is ambiguous, and displaying on a display a textual interpretation. The method also comprises a secondary process, initiated upon receiving an input associated with a delete-character command, deleting an interpreted character. The method is then arranged to return to the primary process where interpretations associated with the deleted character for that position of input text are excluded, wherein the primary and secondary processes are performed until a user input associated with a confirm-text command is received.

An advantage of this is an input method where the user is enabled to intervene in interpretation in an intuitive way.

The textual interpretation may be performed by a processor comparing the generated input sequence with textual objects stored in a memory containing a plurality of such textual objects, each of the plurality of textual objects associated with a possible input sequence. An advantage of this is enabling of a fast interpretation such that a user experiences an instantly provided interpretation.

The method may further comprise selecting one of a plurality of possible interpretations, i.e. after any exclusion, for said step of displaying a textual interpretation. The method may further comprise ranking the plurality of possible interpretations, wherein the highest ranked possible interpretation is selected in said step of selecting one of the plurality of possible interpretations. An advantage of this is that a provided interpretation is likely to match intentions of the user's text input.

The method may further comprise determining a time after reception of the input associated with a delete-character command during which no further user input associated with characters is received, wherein the exclusion of the interpretations associated with the deleted character may be timed out after a predetermined time if no further user input associated with characters is received during the predetermined time after reception of the input associated with a delete-character command. An advantage of this is that the user's intention with the intervention in interpretation may no longer be valid, or remembered by the user, and the interpretation may be experienced to better match the user's intentions.

The secondary process may include storing the deleted character and position of the deleted character in a temporary data structure, and the primary process may include accessing the temporary data structure upon performing the textual interpretation, wherein the temporary data structure may be discarded when the confirm-text command is received. An advantage of this is that the text input procedure maintains low hardware occupation, and thus loads hardware resources less.

The confirm-text command may comprise input of a textual object separator or of a dedicated accept-command on the input device. An advantage of this is intuitive operation.

The performing of the textual interpretation may comprise interpreting the input as an input associated with a character being closest in position to the user actuation position if for that position of input text not being an excluded character; and interpreting the input as another input associated with another character of an input item being in vicinity of the user actuation position and being associated with a character not being excluded. An advantage of this is enhancement of input where input items are tightly positioned, or when a user is typing fast and maybe not hitting input items that accurately. The another character may be associated with another input item being in vicinity of the user actuation position. The another character may be associated with the same input item as the character being excluded.

Textual interpretation may be ambiguous due to discrepancy in detected user actuation position and position of a selected input item at receiving the user input. The textual interpretation may be ambiguous due to the selected input item is associated with a plurality of characters. The textual interpretation may be ambiguous due to a character being associated with a plurality of aggregating user input actions.

According to a second aspect, there is provided an apparatus comprising an input device having a plurality of selectable input items enabling text input by ambiguous input sequences entered by a user, the apparatus further comprising a processor and a display. The processor is arranged to control a primary process of receiving a user input on the input device, wherein an input sequence is being generated in dependence of selection of an input item by manipulating the user input device, the generated input sequence corresponds to the sequence of input items that have been selected, and wherein the generated input sequence has a textual interpretation that is a textual interpretation that is ambiguous, and displaying on the display a textual interpretation; and to control a secondary process, initiated upon receiving an input associated with a delete-character command, of deleting an interpreted character, and returning to the primary process where interpretations associated with the deleted character for that position of input text are excluded, such that the primary and secondary processes are performed until a user input associated with a confirm-text command is received.

The processor may further be arranged to access a memory, wherein the textual interpretation is performed by the processor by comparing the generated input sequence with textual objects stored in the memory containing a plurality of such textual objects, each of the plurality of textual objects associated with a possible input sequence, The processor may further be arranged to select one of a plurality of possible interpretations, i.e. after any exclusion, for the displaying of the textual interpretation on the display. The processor may further be arranged to rank the plurality of possible interpretations, wherein the highest ranked possible interpretation is the selected textual interpretation for being displayed on the display.

The apparatus may further comprise a timer arranged to determine a time after reception of the input associated with a delete-character command during which no further user input associated with characters is received and to provide a time value to the processor, such that the exclusion of the interpretations associated with the deleted character is timed out after a predetermined time if no further user input associated with characters is received during the predetermined time after reception of the input associated with a delete-character command.

The apparatus may further comprise a register, wherein the secondary process includes storing the deleted character and position of the deleted character in a temporary data structure in said register, and the primary process includes accessing the temporary data structure from said register upon performing the textual interpretation, wherein the temporary data structure is discarded when the confirm-text command is received.

The input device may be a touch sensitive surface on said display and arranged to provide a position of touch action to the processor upon user actuation by touch, the display is controlled by the processor to display selectable input items, and the processor is arranged to perform the textual interpretation by interpreting the input as an input associated with a character being closest in position to the user actuation position if for that position of input text not being an excluded character; and interpreting the input as another input associated with another character of an input item being in vicinity of the user actuation position and being associated with a character not being excluded. The another character may be associated with another displayed input item being in vicinity of the user actuation position. The another character may be associated with the same displayed input item as the character being excluded.

According to a third aspect, there is provided a computer program comprising computer executable program code, the program code comprising instructions arranged to cause a processor to perform the method according to the first aspect.

Advantages of the second and third aspects are similar to those demonstrated for the first aspect. Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION OF PREFERRED EMBODIMENTS

Figure 1:
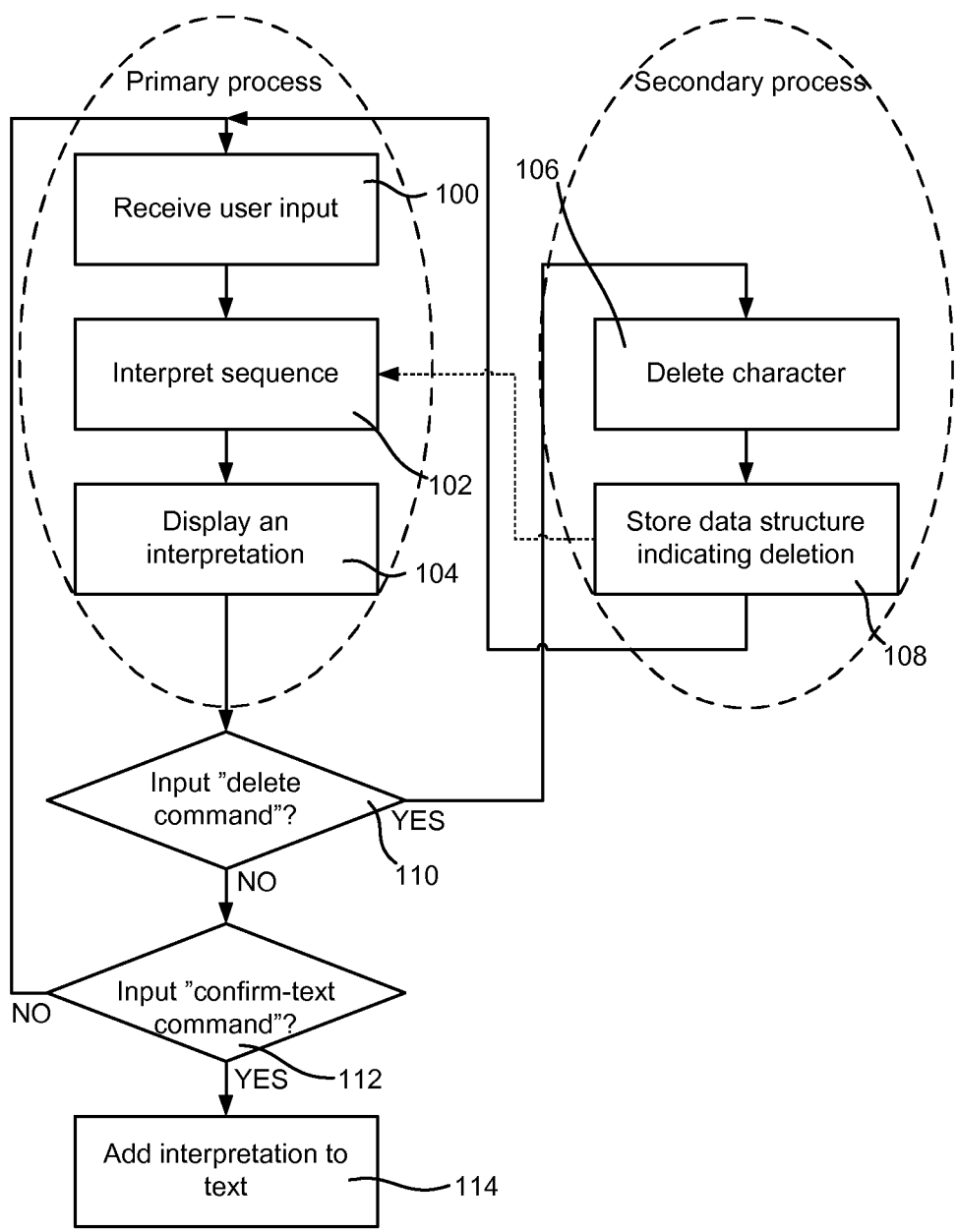
FIG. 1 is a flow chart illustrating a method according to an embodiment.

FIG. 1 is a flow chart illustrating a method according to an embodiment. In a user input reception step 100, a user input is received. The user input is received on an input device having a plurality of selectable input items being associated with characters.

An input item in this context can be a physical key or button, but is preferably a virtual key displayed on a touch sensitive display and which is assigned an association to its function by a program or operating system of the apparatus in question having the input device. Either, each input item is associated with one character, such as for example a QWERTY keyboard, or each input item is associated with a plurality of characters, such as widely used for text input on a numeric keypad, i.e. a so called reduced keyboard, or associating a character with multiple input actions to form a character, e.g. keys representing strokes where a number of input strokes form a character.

An input sequence is generated upon an input item is selected by manipulating the user input device. The generated input sequence corresponds to the sequence of input items that have been selected, i.e. the sequence adds up as the user continues to make inputs.

The generated input sequence has a textual interpretation that is a textual interpretation that is at least to some degree ambiguous. The ambiguity may be due to smallness of the input device, which is normally the case for portable apparatuses as for example mobile phones, where it may be cumbersome for the user to hit correctly on small keys, or where the user operates the apparatus while walking or performing other tasks simultaneously. Ambiguity can also be because of discrepancy between where a user expects for example a finger to hit a touch sensitive display and where the actual detected touch position really is. A further reason for ambiguity is of course where several characters are associated with one input item.

The textual interpretation is performed by a processor comparing the generated input sequence with textual objects stored in a memory containing a plurality of such textual objects. The textual objects can be based on words, word stems, expressions or other pieces of written language. Thus, each of the plurality of textual objects are associated with a possible input sequence forming such a word, word stem, expression or other piece of written language. The textual objects can be encoded in a plurality of ways, e.g. by ASCII, ISO/IEC 8859-1 or UTF, but also with hash values. Hash values can be used for dictionaries to quickly search in them. For example each word in the dictionary can have a hash value and the input can translated into a hash value that then matches a dictionary word.

One or more interpretations of the textual intent of the input can thus be determined in a sequence interpretation step 102. If several interpretations are possible, which is often the case at least for short sequences since not only sequences of equal length as the input sequence is made, an interpretation can be chosen for displaying on a display in a interpretation displaying step 104 based on for example statistical and/or contextual analysis.

This process can be performed while consecutive user inputs associated with characters are received, or at editing of text. However, apparatuses can never in all situations predict the intentions of a user. For alleviating this, the user is given more control at the same time as the apparatus is supporting to its best. This is achieved by the user indicating by giving a delete command when satisfactory interpretation is not presented, and a secondary process, initiated 110 upon the reception of an input associated with a delete-character command, is performed before returning to the input process.

This secondary process comprises deleting an interpreted character in a deletion step 106, which can be the latest interpreted character or a character indicated by the user in any other way, e.g. by setting a cursor or other graphical user interface object at the non-satisfactory character, wherein the indicated non-satisfactory character and its position in the text is considered upon further interpretation such that such non-satisfactory interpretation is excluded. This can be implemented by storing 108 a data structure comprising the deleted character and its position in the text.

Feedback can be provided to the user by for example showing the deleted character on the input device as inactive, e.g. the virtual key or part of virtual key indicating the deleted character being "greyed out".

If the user deletes several characters, e.g. consecutively, the user's intention may be to reformulate the text, and not to intervene with the interpretation. This can be detected by analysing input behaviour of delete commands and upon detection that it is probable that the user's intention is reformulation rather than intervention in interpretation, e.g. major part of word being deleted, number of consecutive delete commands exceeds a threshold, or time between delete commands is below a threshold, then no exclusion of interpretations is caused, and the primary process continues without any exclusions due to these deletions.

Figure 2:
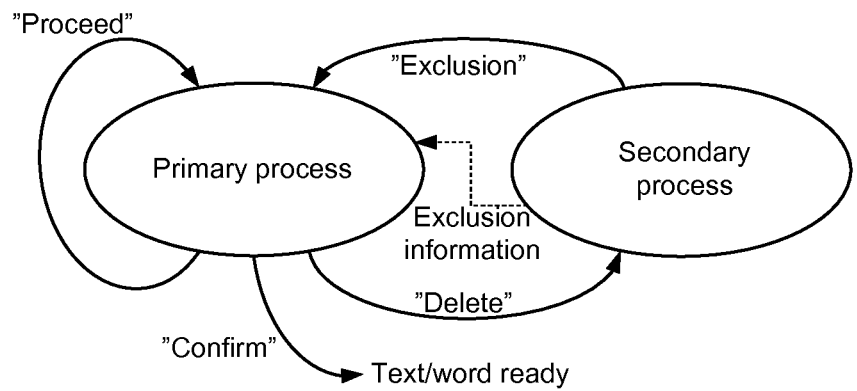
FIG. 2 is a process diagram illustrating a method according to an embodiment.

For the understanding of the approach, the terms "primary process" and "secondary process" are used in the drawings and this disclosure, where the primary process is intended to demonstrate main input and interpretation process, and the secondary process is intended to indicate the user's intervention in the interpretation. These processes need not be part of the implementation, and are here used for facilitating understanding of the principles. FIG. 2 is a process diagram illustrating a method according to an embodiment in a more general way, where transitions due to input of a "delete" command, secondary process causing an "exclusion" of interpretations in the primary process, a "confirm" command causes a settlement of interpretation, or the primary process is caused to "proceed" if no intervention or settlement is the case. In FIG. 1, it is for example illustrated that after a deletion, the process starts with receiving 100 a new input. This is not necessary. According to an embodiment, the process instead makes/selects a new interpretation with the exclusion. Thus, the term deletion can here both be interpreted as deletion of the character and as deletion of the interpretation with the displayed character, but without need to make a new input associated with a character for replacing the deletion. Further, in FIG. 1 it is indicated that the exclusion is performed at interpretation 102. However, the exclusion can equally be performed at selection and displaying 104 of interpretation candidate among interpretations already made.

The primary and secondary processes are performed until a user input associated with a confirm-text command is received 112, wherein the interpreted text is settled 114 in an application in question, e.g. a messaging application.

The exclusion of the interpretations associated with the deleted character can be timed out after a predetermined time if no further user input associated with characters is received during the predetermined time after reception of the input associated with a delete-character command. Thus, if the user regrets a delete action, it only takes a while, and the exclusion of interpretations is reset.

The secondary process can include storing the deleted character and position of the deleted character in a temporary data structure. The primary process can then include accessing the temporary data structure upon performing the textual interpretation, or when selecting interpretation candidate for displaying. The temporary data structure is preferably discarded when the confirm-text command is received. The discarding can be any of deleting the data structure or deleting contents, i.e. character(s) and position(s) of the data structure, or overwriting contents, deleting or overwriting references to data structures, etc.

The confirm-text command comprises input of a textual object separator or of a dedicated accept-command of the input device, e.g. hitting an OK key, which may be a hard or soft key. In this context, a textual object separator can be a space symbol or a punctuation symbol. A punctuation symbol can for example be any of an apostrophe, brackets, colon, comma, dashes, full stop, question mark, semicolon, slash, etc.

For a one-to-one relation between input items and characters, the textual interpretation can comprise interpreting the input as an input associated with a character being closest in position to the user actuation position. However, if the associated character for that position of the input text is an excluded character, the interpreting of the input is made as another input associated with another character of an input item being in vicinity of the user actuation position and being associated with a character not being excluded. The another character is thus associated with another input item being in vicinity of the user actuation position. For a one-to-multiple relation between input item and characters, the another character can instead be associated with the same input item as the character being excluded, i.e. another character associated with that input item can be chosen.

For example an interpretation approach in this context may use more than the position of the current actuation and look-up in textual objects to decide the character; it may use a previous actuation position and time to decide the current character. For example, by considering that if the finger is likely to move in a certain direction when moving from the previous actuation position for actuating at the new input actuation position, it can be assumed that a larger variability along that direction, e.g. considered as a vector in calculations by the processor, and less variability along an orthogonal direction, which also can be considered as a vector in the calculations. This is an example how the processor can make calculations of likelihood which possibly can be used for example for selecting a candidate interpretation to be displayed, and/or for ranking candidate interpretations based on likelihood, possibly together with further statistical analysis. Similar physical phenomena, such as an assumed angle of finger based on knowledge of preferred left or right hand use by user, portrait or landscape use of display/apparatus, etc., can be used for likelihood calculations. The interpretation approach can have many things that makes up its final decision and by deleting a character such that interpretation can be weighted down in calculating the probability of an interpretation in the current case radically, and in upcoming interpretations eventually. A timed out delete characters is an example, as described herein, of how this can be implemented, where the probability of the delete character instantly decrease but then gradually/step-wise increase in probability again.

Figure 3:
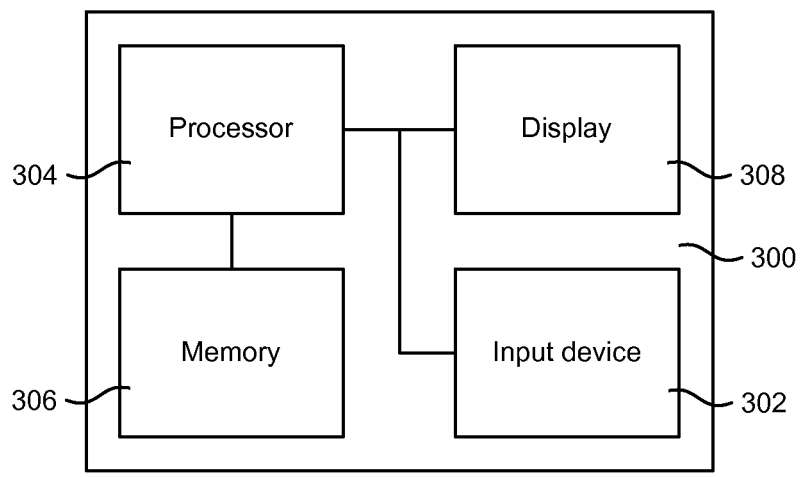
FIG. 3 schematically illustrates an apparatus according to an embodiment.

FIG. 3 schematically illustrates an apparatus 300 according to an embodiment. The apparatus 300 comprises an input device 302 having a plurality of selectable input items being associated with characters, a processor 304, a memory 306 and a display 308. The input device 302 and display 308 can form one element by being a touch sensitive display and the above demonstrated virtual keyboard or keypad can be implemented, but the input device 302 and display 308 may also be separate elements. Text input to the apparatus is arranged to be performed according to any of the embodiments above. Thus, the processor 304 receives the detected user input sequence from the input device 302, compares with sequences stored in the memory 306 and makes an interpretation that is sent to the display 308, etc.

The input items associated with characters can be virtual keys arranged under control of the processor on the display, in the case of a touch sensitive display, such that user actuation is detected by the touch sensitive display. In case of a physical keyboard or keypad, there is preferably a static association with characters to the keys of the physical keypad or keyboard.

Figure 4:
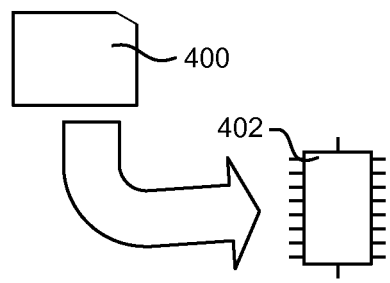
FIG. 4 schematically illustrates a computer program product and a processor arranged to execute a computer program of the computer program product.

FIG. 4 schematically illustrates a computer program product and a processor arranged to execute a computer program of the computer program product. The methods according to the embodiments demonstrated above are suitable for implementation with aid of processing means, such as computers and/or processors, especially for the case where the application is a communication apparatus such as a mobile phone or a so called "smartphone", i.e. a combined mobile telephone and portable computer or portable digital assistant, which apparatuses normally are arranged with non-negligible processing power and also with an operating system for handling one or more applications or computer programs. Therefore, there is provided computer programs, comprising instructions arranged to cause the processing means, processor, or computer to perform the steps of any of the methods according to any of the embodiments described with reference to FIG. 1 or 2. The computer programs preferably comprises program code which is stored on a computer readable medium 400, as illustrated in FIG. 4, which can be loaded and executed by a processing means, processor, or computer 402 to cause it to perform the methods, respectively, according to embodiments of the present invention, preferably as any of the embodiments described with reference to FIG. 1 or 2. The computer 402 and computer program product 400 can be arranged to execute the program code sequentially where actions of the any of the methods are performed stepwise. The processing means, processor, or computer 402 can be what normally is referred to as an embedded system. Thus, the depicted computer readable medium 400 and computer 402 in FIG. 4 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for text input of ambiguous input sequences entered by a device user, the method comprising:
   a primary process of
      receiving a user input on an input device having a plurality of selectable input items, each input item being associated with at least one character, an input sequence being generated in dependence of selection of input items, wherein the generated input sequence corresponds to the sequence of input items that have been selected, and wherein the generated input sequence has a textual interpretation of the characters associated with the input sequence, wherein the textual interpretation is ambiguous, and
      displaying on a display the textual interpretation; and
   a secondary process, initiated upon receiving an input associated with a delete-character command and comprising
      deleting a character of the textual interpretation, at a position thereof, wherein the deleted character corresponds to a first input item, and
      returning to the primary process where textual interpretations associated with the deleted character for said position are excluded, and
      displaying an updated textual interpretation, wherein the updated textual interpretation, at a position corresponding to the deleted character of the textual interpretation, has another character being associated with a second input item of the input device, wherein the second input item is in vicinity of the first input item;
   wherein the primary and secondary processes are performed until a user input associated with a confirm-text command is received.

2. The method of claim 1, wherein the textual interpretation is performed by a processor comparing the generated input sequence with textual objects stored in a memory containing a plurality of such textual objects, each of the plurality of textual objects being associated with a possible input sequence.

3. The method of claim 1, further comprising selecting one of a plurality of possible interpretations, after any exclusion, for said step of displaying the textual interpretation.

4. The method of claim 3, further comprising ranking the plurality of possible interpretations, wherein the highest ranked possible interpretation is selected in said step of selecting one of the plurality of possible interpretations.

5. The method of claim 1, further comprising determining a time after reception of the input associated with a delete-character command during which no further user input associated with characters is received, wherein the exclusion of the interpretations associated with the deleted character is timed out after a predetermined time if no further user input associated with characters is received during the predetermined time after reception of the input associated with a delete-character command.

6. The method of claim 1, wherein the secondary process includes storing the deleted character and position of the deleted character in a temporary data structure, and the primary process includes accessing the temporary data structure upon performing the textual interpretation, wherein the temporary data structure is discarded when the confirm-text command is received.

7. The method of claim 1, wherein the confirm-text command comprises input of a textual object separator or of a dedicated accept command on the input device.

8. The method of claim 1, wherein the performing of the textual interpretation comprises:
   interpreting the input as an input associated with a character being closest in position to the user actuation position if for that position of input text not being an excluded character; and
   interpreting the input as another input associated with another character of an input item being in vicinity of the user actuation position and being associated with a character not being excluded.

9. The method of claim 1, wherein textual interpretation is ambiguous due to discrepancy in detected user actuation position and position of a selected input item at receiving the user input.

10. The method of claim 1, wherein textual interpretation is ambiguous because the selected input item is associated with a plurality of characters.

11. The method of claim 1, wherein textual interpretation is ambiguous because a character is associated with a plurality of aggregating user input actions.

12. An apparatus comprising an input device having a plurality of selectable input items enabling text input by ambiguous input sequences entered by a device user, the apparatus further comprising a processor and a display, wherein the processor is arranged to control a primary process of
   receiving a user input on the input device, wherein an input sequence is being generated in dependence of selection of an input item by manipulating the user input device, wherein each input item is associated with at least one character, the generated input sequence corresponds to the sequence of input items that have been selected, and wherein the generated input sequence has a textual interpretation of the characters associated with the input sequence, wherein the textual interpretation is ambiguous, and
   displaying on the display a textual interpretation;
   and wherein the processor is arranged to control a secondary process, initiated upon receiving an input associated with a delete-character command, of:
   deleting a character of the textual interpretation, at a position thereof, wherein the deleted character corresponds to a first input item, and
   returning to the primary process where textual interpretations associated with the deleted character for said position are excluded, and
   displaying an updated textual interpretation, wherein the updated textual interpretation, at a position corresponding to the deleted character of the textual interpretation, has another character being associated with a second input item of the input device, wherein the second input item is in vicinity of the first input item;
   such that the primary and secondary processes are performed until a user input associated with a confirm-text command is received.

13. The apparatus of claim 12, wherein the processor is further arranged to access a memory, wherein the textual interpretation is performed by the processor by comparing the generated input sequence with textual objects stored in the memory containing a plurality of such textual objects, each of the plurality of textual objects being associated with a possible input sequence.

14. The apparatus of claim 12, wherein the processor is further arranged to select one of a plurality of possible interpretations, after any exclusion, for the displaying of the textual interpretation on the display.

15. The apparatus of claim 14, wherein the processor is further arranged to rank the plurality of possible interpretations, wherein the highest ranked possible interpretation is the textual interpretation selected for being displayed on the display.

16. The apparatus of claim 12, further comprising a timer arranged to determine a time after reception of the input associated with a delete-character command during which no further user input associated with characters is received and to provide a time value to the processor, such that the exclusion of the interpretations associated with the deleted character is timed out after a predetermined time if no further user input associated with characters is received during the predetermined time after reception of the input associated with a delete-character command.

17. The apparatus of claim 12, further comprising a register, wherein the secondary process includes storing the deleted character and position of the deleted character in a temporary data structure in said register, and the primary process includes accessing the temporary data structure from said register upon performing the textual interpretation, wherein the temporary data structure is discarded when the confirm-text command is received.

18. The apparatus of claim 12, wherein the input device is a touch sensitive surface on said display and is arranged to provide a position of touch action to the processor upon user actuation by touch, the display is controlled by the processor to display selectable input items, and the processor is arranged to perform the textual interpretation by interpreting the input as an input associated with a character being closest in position to the user actuation position if for that position of input text not being an excluded character; and interpreting the input as another input associated with another character of an input item being in vicinity of the user actuation position and being associated with a character not being excluded.

19. A non-transitory computer-readable medium comprising a computer program stored thereon, the computer program comprising computer executable program code, the program code comprising instructions arranged to cause a processor to perform:
   a primary process of
   receiving a user input on an input device having a plurality of selectable input items, each input item being associated with at least one character, an input sequence being generated in dependence of selection of input items, wherein the generated input sequence corresponds to the sequence of input items that have been selected, and wherein the generated input sequence has a textual interpretation of the characters associated with the input sequence, wherein the textual interpretation is ambiguous, and
   displaying on a display the textual interpretation; and
   a secondary process, initiated upon receiving an input associated with a delete-character command and comprising
   deleting a character of the textual interpretation, at a position thereof, wherein the deleted character corresponds to a first input item, and
   returning to the primary process where textual interpretations associated with the deleted character for said position are excluded, and
   displaying an updated textual interpretation, wherein the updated textual interpretation, at a position corresponding to the deleted character of the textual interpretation, has another character being associated with a second input item of the input device, wherein the second input item is in vicinity of the first input item;

wherein the primary and secondary processes are performed until a user input associated with a confirm-text command is received.

* * * * *